(12) United States Patent
Satoh et al.

(10) Patent No.: US 7,272,423 B2
(45) Date of Patent: Sep. 18, 2007

(54) CLAMSHELL PORTABLE WIRELESS TERMINAL WITH AN UPPER HOUSING AND A LOWER HOUSING JOINED TOGETHER WITH A ROTATING HINGE

(75) Inventors: Noriyoshi Satoh, Yokohama (JP); Kazuaki Takamori, Setagaya-ku (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 108 days.

(21) Appl. No.: 10/525,555

(22) PCT Filed: Aug. 5, 2003

(86) PCT No.: PCT/JP03/09957

§ 371 (c)(1),
(2), (4) Date: Feb. 24, 2005

(87) PCT Pub. No.: WO2004/018885

PCT Pub. Date: Mar. 4, 2004

(65) Prior Publication Data

US 2006/0162122 A1 Jul. 27, 2006

(30) Foreign Application Priority Data

Aug. 26, 2002 (JP) ............................. 2002-245109

(51) Int. Cl.
*H04M 1/00* (2006.01)

(52) U.S. Cl. .............................. 455/575.3; 455/550.1; 455/433.11

(58) Field of Classification Search .. 455/575.1–575.9, 455/550.1, 90.3, 556.1–556.2; 379/433.13
See application file for complete search history.

(56) References Cited

U.S. PATENT DOCUMENTS 6,549,789 B1 * 4/2003 Kfoury .................... 455/550.1
6,965,413 B2 * 11/2005 Wada ......................... 348/376

FOREIGN PATENT DOCUMENTS

| JP | 6-311216 | 11/1994 |
| JP | 2000-240636 | 9/2000 |
| JP | 2001-251406 | 9/2001 |
| JP | 2002-155923 | 5/2002 |
| JP | 2002171189 | 6/2002 |

* cited by examiner

*Primary Examiner*—Lester G. Kincaid
*Assistant Examiner*—Sayed T. Zewari
(74) *Attorney, Agent, or Firm*—Pearne & Gordon LLP

(57) ABSTRACT

A purpose of the present invention is to provide a compact hinge apparatus in which a clearance between a rotating shaft and cover members is small and a rotation radius of the rotating shaft is small, and to provide an opening/closing type communication terminal equipped with the hinge apparatus. The hinge apparatus is comprised of: a hollow-shaped first rotating shaft (125) which can be pivotably moved; a second rotating shaft (126) which is intersected with this first rotating shaft (125) in a pivotable manner; a guide shaft (128) which is provided inside the first rotating shaft (125) and guides a cam (132) mounted on the second rotating shaft (126) at a predetermined position; a first casing member which is mounted on the first rotating shaft (125) in an integral manner; a second casing member which is mounted on the first rotating shaft in an integral manner; and both a front cover (141) and a rear cover (142), which cover both the first rotating shaft (125) and the second rotating shaft (126). In the hinge apparatus, the front cover (141) and the second cover (142) are fixed on the first rotating shaft (125) by a fastening screw (143).

7 Claims, 11 Drawing Sheets

CLAMSHELL PORTABLE WIRELESS TERMINAL WITH AN UPPER HOUSING AND A LOWER HOUSING JOINED TOGETHER WITH A ROTATING HINGE

TECHNICAL FIELD

The present invention is related to a compact hinge apparatus in which a clearance between a rotating shaft and a cover member is narrow and a rotation radius of the rotating shaft is small, and also, is related to an opening/closing type communication terminal equipped with this hinge apparatus.

BACKGROUND ART

As conventional opening/closing type communication terminals, for instance, an opening/closing type portable terminal apparatus is disclosed in JP-A-2001-251406, in which one casing is rotated along a direction perpendicular to an opening/closing direction. The opening/closing type portable terminal apparatus of this publication is arranged by employing an input unit for inputting information, a display unit for monitoring an operation condition and for displaying reception data, a control unit for controlling the input unit and the display unit, and a casing. It should be noted that the input unit owns a first input unit such as numeral keys, and a second input unit such as function keys. Also, the casing is arranged as follows. That is, this casing is divided into a first casing on which the second input unit is provided, and a second casing on which both the display unit and the second input unit are provided. The first casing is connected to the second casing by a hinge portion in a pivotable manner. Both the first casing and the second casing can be freely opened and closed, while the hinge portion is set as a rotation shaft.

As hinge apparatus for realize such a hinge portion, for example, one hinge apparatus is disclosed in JP-A-2000-240636. Referring now to FIG. 11, the hinge apparatus disclosed in JP-A-2000-240636 will be described. FIG. 11 is a plan view (A) and a side view (B) of the hinge apparatus disclosed in JP-A-2000-240636.

The hinge apparatus shown in FIG. 11 is arranged by employing the opening/closing shaft 202, the rotation shaft 203, the angle restricting piece 204, the restricting flange 205, and the rotation restricting portion 206. The opening/closing shaft 202 is pivotably supported by an opening/closing shaft supporting portion 201. The rotation shaft 203 rotatably penetrates through the opening/closing shaft 202 under perpendicular intersecting condition. The angle restricting piece 204 is provided in such a manner that this angular restricting piece 204 mutually abuts against both the opening/closing shaft supporting portion 201 and the opening/closing shaft 202. The restricting flange 205 is provided on the rotation shaft 202 under projected condition. The rotation restricting portion 206 is faced to the restriction flange 205 mounted on the opening/closing shaft supporting portion 201. In the case that this hinge apparatus is applied to the above-described opening/closing type communication terminal, a dimension of a hinge portion as the rotation shaft is determined by such a distance between a tip portion of the angle restricting piece 204 which is moved in connection with the rotation of the rotation shaft 203 and an axis center of the rotation shaft 203.

Also, as the conventional opening/closing type communication terminals, a portable telephone is disclosed in JP-A-6-311216. In the portable telephone disclosed in this publication, a first casing which is constituted by both a first front case and a first rear cover is pivotably connected to a second casing which is constituted by a second front case and a second rear cover by way of a hinge portion. Also, a first curved plane portion having an arc shape which is provided at an edge portion of the first front case is engaged with a second curved plane portion having an arc shape which is provided at an edge portion of the first rear cover so as to construct a first cavity portion having a substantially cylindrical shape which is internally communicated with the first casing at an edge portion of this first casing. Also, a second cavity portion having a substantially cylindrical shape is constituted at an edge portion of the second casing, which is internally communicated with this second casing. Then, the first cavity portion and the second cavity portion are arranged adjacent to each other in a coaxial manner. Also, a flexible printed board which connects an electric circuit employed in the first casing to an electric circuit employed in the second casing is wound and penetrated in a spiral shape along both an inner diameter of the first cavity portion and an inner diameter of the second cavity portion. Also, a cable which is present and is bridged over both the casings is elongated within an internal diameter of the flexible printed board which is wound in the spiral shape.

However, in the above-explained conventional communication terminal, even if the conventional hinge portion is mounted on such an apparatus as a portable telephone which is requested to be made compact so as to realize an opening/closing type portable telephone and the like, there is a problem that the apparatus becomes a large size due to the dimension of the hinge portion. Also, the dimension of the hinge portion is determined based upon the diameter of the opening/closing shaft, and the rotation radius of the angle restricting piece provided on the edge portion of the rotation shaft. In such an arrangement that the angle restricting piece is provided at the edge portion of the rotation shaft, the rotation radius is increased. There is such a problem that the size of the hinge portion becomes large.

Furthermore, since the opening/closing type portable telephone, or the like owns such a structure that bending stress and twist stress are produced on the flexible printed board in connection with the opening/closing operation thereof, there is a risk that a conductor portion (circuit pattern) of the flexible printed board is cut out.

FIG. 12 is a plan view for showing a flexible printed board which penetrates through the conventional hinge portion. As indicated in this drawing, the flexible printed board 300 is wound in a spiral shape within the hinge portion in order to be connected to connectors which are provided on a first casing (not shown) and a second casing (not shown) respectively. A twist angle "P" (see FIG. 12) of the flexible printed board which is wound in a right winding direction and directed from a lower side to an upper side is not changed even in such a case that the casings are folded. It should be noted that a two-dot and dash line indicates such a case that the casings have been folded.

However, since fixing positions (right/left directions) of both edges of the flexible printed board with respect to the first casing and the second casing are not changed, if the first casing and the second casing are folded from the opened condition, then the twist angle "P" is chanted into an approximately P/2. In other words, since the first casing and the second casing are folded, such a construction is made that both the bending stress and the twist angle are added to the flexible printed board.

Generally speaking, a flexible printed board owns a flexible characteristic, and thus, has a sufficiently strong construction with respect to bending stress. However, when various sorts of stress are applied in a composite manner to the flexible printed board, circuit disconnections and broken boards of the flexible printed board may be conducted. As a consequence, in the conventional opening/closing type portable telephones, if the opening/closing operations are repeatedly carried out, then the circuit disconnections and the broken boards of the flexible printed boars are conducted, which should be still improved.

Also, in the hinge apparatus (see FIG. 11) described in the above-explained JP-A-2000-240636, in such a case that an outer decoration cover for covering both the opening/closing shaft 202 and the rotation shaft 203 is provided, since the hinge apparatus owns such a structure that the opening/closing shaft 202 is pivotably moved within the opening/closing shaft supporting unit 201, the outer decoration cover cannot be made in close contact to the opening/closing shaft supporting portion 201 in order to avoid abrasion with respect to the opening/closing shaft supporting portion 201. As a result, a clearance is produced between the outer decoration cover and the opening/closing shaft 202. There is a risk that rain and the like are entered into this clearance, which may cause corrosion of appliances.

The present invention is made to solve the above-described conventional problems, and therefore, has an object to provide both a hinge apparatus in which a clearance between a rotating shaft and a cover member is small, and an opening/closing type communication terminal equipped with this hinge apparatus. Furthermore, the present invention owns another object to provide both a compact hinge apparatus in which a rotation radius of the rotating shaft is small, and also, an opening/closing type communication terminal equipped with this hinge apparatus.

DISCLOSURE OF THE INVENTION

To achieve the above-described objects, an opening/closing type communication terminal, according to the present invention, is feature by such an opening/closing type communication terminal constituted by two casing members which are coupled to each other in an openable/closable manner by way of a hinge portion, in which the hinge portion includes: a hollow-shaped first rotating shaft which constitutes an axis when the two casing members are pivotably moved along a predetermined direction; a second rotating shaft which constitutes an axis in the case that one casing member of the two casing members is pivotably moved with respect to the other casing member along a direction perpendicular to the pivot direction when the first rotating shaft is used as the axis; and a cover member for covering both the first rotating shaft and the second rotating shaft; and in which the cover member is fixed to the first rotating shaft.

As a consequence, since the cover members are pivotably moved at the same time in connection with the rotating movement of the first rotating shaft, the cover members can be continuously made in close contact to the first rotating shaft. As a result, since no clearance is produced between the first rotating shaft and the cover members when the casing member is pivotably moved while the first rotating shaft is set as the shaft, it is possible to avoid that rain and the like are penetrated.

Also, an opening/closing type communication terminal, according to the present invention, is featured by that a rotating movement restricting member is provided in a hollow-shaped internal portion of the first rotating shaft; and the rotating movement restricting member restricts both the rotating movement while the first rotating shaft is set as the axis and the rotating movement while the second rotating shaft is set as the axis. As a consequence, since the rotation radius while the first rotating shaft is set as the axis can be made small, the hinge portion can be made compact.

Also, an opening/closing type communication terminal, according to the present invention, is featured by that a stable condition of the communication terminal restricted by the rotating movement restricting member may preferably correspond to any one of: such a condition that the two casing members have been folded to be located opposite to each other; a first opened condition under which the communication terminal under the folded condition is opened by pivotably moving the two casing members up to a first predetermined angle while the first rotating shaft is set as the axis; and a second opened condition under which the casing members have been pivotably moved from the first opened condition up to the second predetermined angle while the second rotating shaft is set as the axis.

Also, an opening/closing type communication terminal, according to the present invention, is featured by that the rotating movement restricting member restricts the rotating movement while the second rotating shaft is set as the axis along a predetermined direction and at the second predetermined angle under the first opened condition; the rotating movement restricting member prohibits the rotating movement while the first rotating shaft is set as the axis under the second opened condition, and also, restricts the rotating movement while the second rotating shaft is set as the axis along a direction opposite to the second predetermined direction and at the second predetermined angle under the second opened condition; and the rotating movement restricting member prohibits the rotating movement while the second rotating shaft is set as the axis under such a condition from the folded condition up to the first opened condition.

As a consequence, even when the user mistakenly operates the communication terminal, it is possible to avoid that one casing member is struck and scratched by the other casing member.

Also, an opening/closing type communication terminal, according to the present invention, is featured by that the cover member is fixed to the first rotating shaft by a fastening screw; and the fastening screw is covered by the casing members under both the folded condition and the first opened condition, and fixes the cover member on the first rotating shaft at such a position that the fastening screw is exposed under such a condition from the first opened condition up to the second opened condition.

As previously explained, since the head portion of the fastening screw is hidden under the folded condition and the fist opened condition, an outer appearance of the communication terminal can be improved. Also, since the head portion of the fastening screw is exposed under such a condition defined from the first opened condition up to the second opened condition, the cover members can be easily dismounted from the first rotating shaft.

Also, an opening/closing type communication terminal, according to the present invention, is featured by that the second predetermined angle is 180 degrees at which the casing members are pivotably moved in order to become the second opened condition from the first opened condition while the second rotating shaft is set as the axis; the communication terminal includes: a condition detecting member for detecting either the first opened condition or the second opened condition of the communication terminal; one of the two casing members includes a camera unit and a first display unit capable of displaying thereon a picture photographed by the camera unit on one plane thereof, and also includes a second display unit capable of displaying thereon a picture formed based upon the picture photographed by the camera unit on another plane opposite to the one plane; the first display unit displays thereon a mirror image as to the picture photographed by the camera unit under either the folded condition or the first opened condition; and the first display unit displays thereon the mirror image as to the picture photographed by the camera unit, and the first display unit displays thereon an inverted mirror image of the mirror image under the second opened condition.

As a consequence, a user who holds this communication terminal by his hand can confirm the image by viewing the inverted mirror image displayed on the second display unit. On the other hand, a person corresponding to a photographic object located in front of the user can confirm how the own image is photographed by viewing the mirror image displayed on the first display unit.

In addition, a hinge apparatus, according to the present invention, is featured by that the hinge apparatus constitutes the hinge portion in the opening/closing type communication terminal as recited in any one of claim 1 to claim 6.

Figure 1:
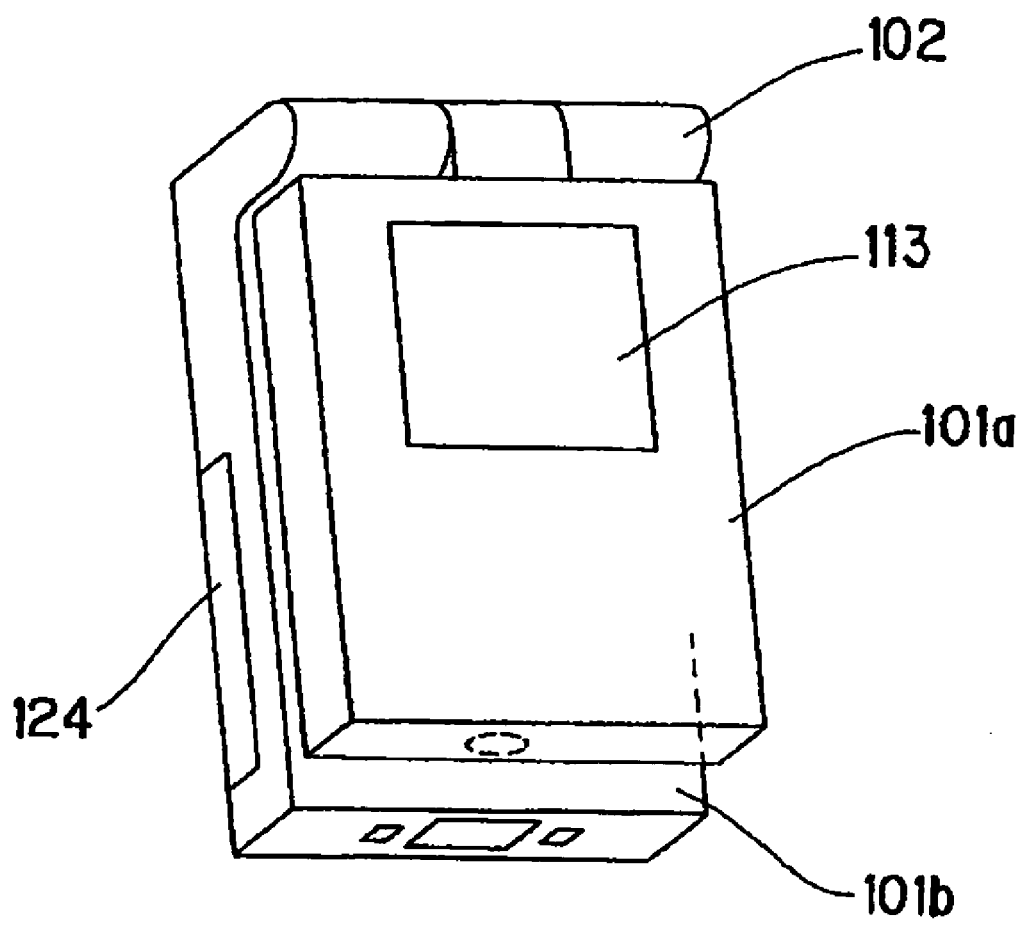
FIG. 1 is a perspective view for indicating a closed condition of a communication terminal according to an embodiment of the present invention.

It should be noted that in the drawings, reference numeral 101 shows a casing; reference numeral 101a indicates a first casing member; reference numeral 101b represents a second casing member; reference numerals 101c and 101d show hinge mounting portions; reference numeral 101e denotes a hole having a "D"-shape; reference numeral 101f shows a bearing portion; reference numeral 102 indicates a hinge portion; reference numeral 103 represents an antenna; reference numeral 104 denotes a vibrator unit; reference numeral 105 shows an operation unit; reference numeral 106 represents a receiver; reference numeral 107 indicates a speaker; reference numeral 108 is a microphone; reference numeral 109 shows a camera unit; reference numeral 110 indicates a first Hall-effect element; reference numeral 111 shows a second Hall-effect element; reference numeral 112 indicates a first display unit; reference numeral 113 represents a second display unit; reference numeral 114 denotes a first permanent magnet; reference numeral 115 shows a second permanent magnet; reference numeral 116 denotes a printed board; reference numeral 117 indicates a transmitting/receiving unit; reference numeral 118 shows a data processing unit; reference numeral 119 indicates a voice processing unit; reference numeral 120 shows an image processing unit; reference numeral 121 indicates an information recording unit; reference numeral 122 shows a control unit; reference numeral 123a indicates a projection; reference numeral 123b indicates a clearance; reference numeral 124 represents a battery; reference numeral 125 indicates a first rotating shaft; reference numeral 125a represents a notch portion; reference numeral 125b indicates a supporting portion; reference numeral 125c shows a partition portion; reference numeral 125d denotes a slit; reference numeral 125e represents a screw hole; reference numeral 126 shows a second rotating shaft; reference numeral 127 is a supporting plate; reference numeral 127a indicates a concave portion; reference numeral 127b represents a supporting hole; reference numeral 128 represents a guide shaft; reference numeral 128a shows a large diameter portion; reference numeral 128b represents a small diameter portion; reference numeral 128c denotes a parallel groove; reference numeral 128d shows a D-cut portion; reference numeral 129 denotes a first coil spring; reference numeral 130 represents a first click convex plate; reference numeral 130a is a convex portion; reference numeral 131 indicates a first click concave plate; reference numeral 131a shows a concave portion; reference numeral 132 indicates a cam; reference numeral 133 is a second click convex plate; reference numeral 133a shows a convex portion; reference numeral 134 indicates a second coil spring; reference numeral 135 denotes a bracket; reference numeral 135a is a hole; reference numeral 136 indicates an E ring; reference numeral 137 represents a first rotating shaft bearing; reference numeral 137a shows a groove; reference numeral 138 indicates a hinge portion; reference numeral 139 shows a flexible board; reference numeral 139a shows a corner portion; reference numeral 139b indicates a first winding portion; reference numeral 139c represents a second winding portion; reference numeral 140 shows a cable; reference numeral 141 indicates a front cover; reference numeral 141a denotes an engaging claw; reference numeral 141b represents a screw penetration hole; reference numeral 142 shows a rear cover; reference numeral 142a denotes an engaging claw; reference numeral 142b represents a screw penetration hole; and reference numeral 144 shows a fastening screw.

BEST MODE FOR CARRYING OUT THE INVENTION

Referring now to drawings, a detailed description is made of an embodiment as to opening/closing type communication terminal according to the present invention. It should be understood that although the communication terminal will be described as an opening/closing type portable telephone in this embodiment, the present invention is not limited only to portable telephones, but the present invention may be applied to any other apparatus if these other apparatus are opening/closing type apparatus.

Figure 2:
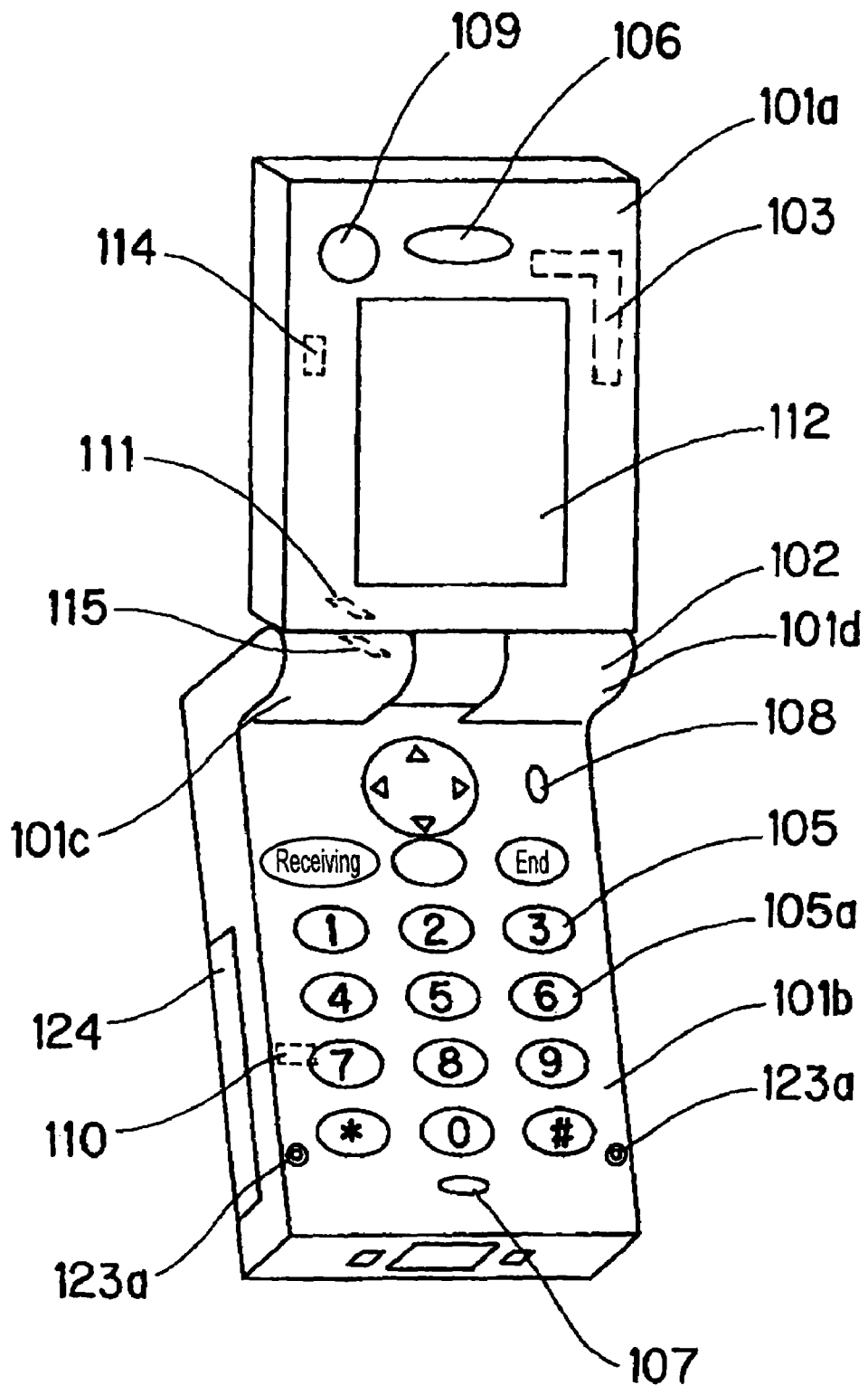
FIG. 2 is a perspective view for representing a first opened condition of the communication terminal according to the embodiment of the present invention.
Figure 3:
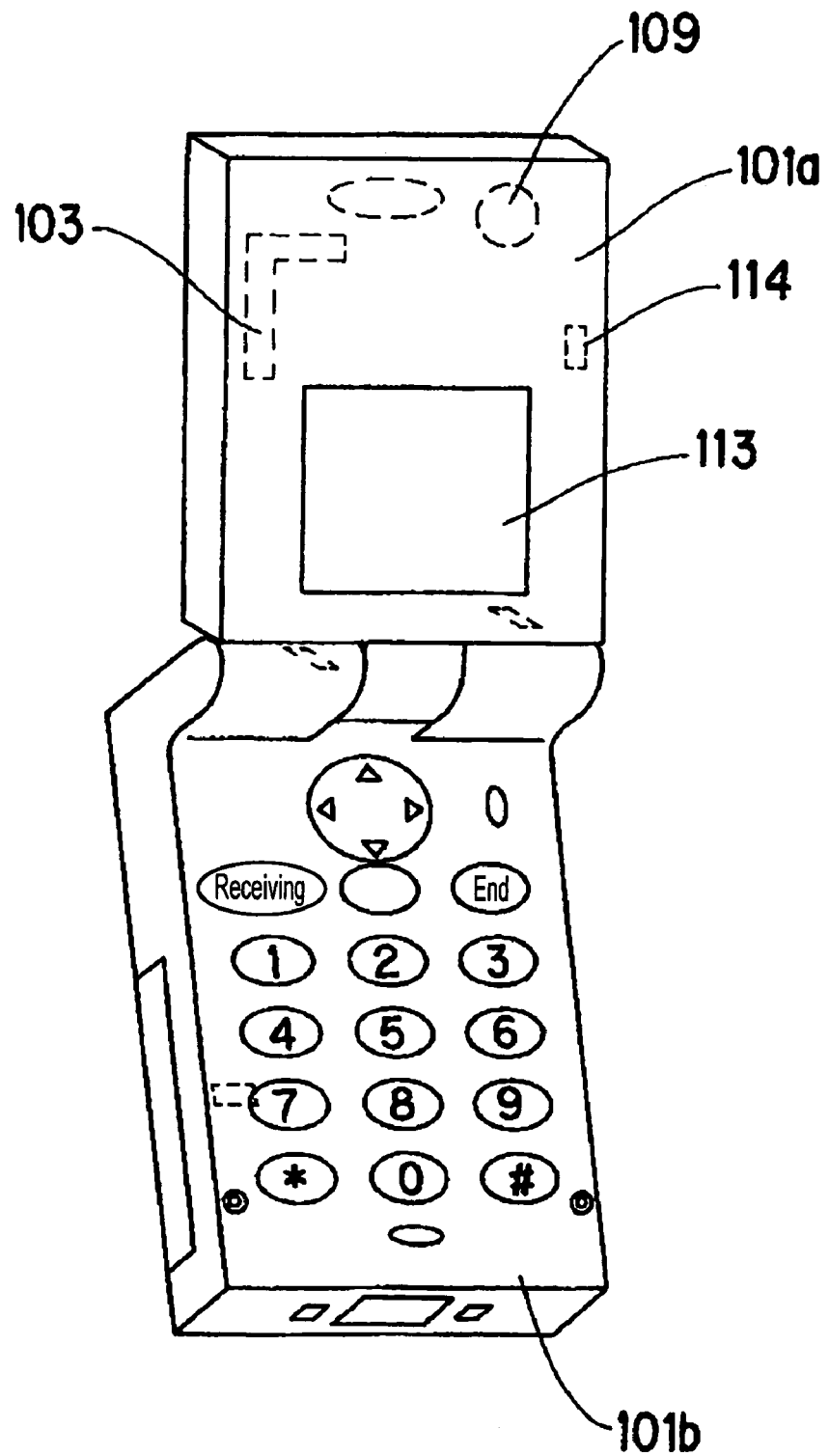
FIG. 3 is a perspective view for showing a second opened condition of the communication terminal according the embodiment of the present invention.
Figure 4:
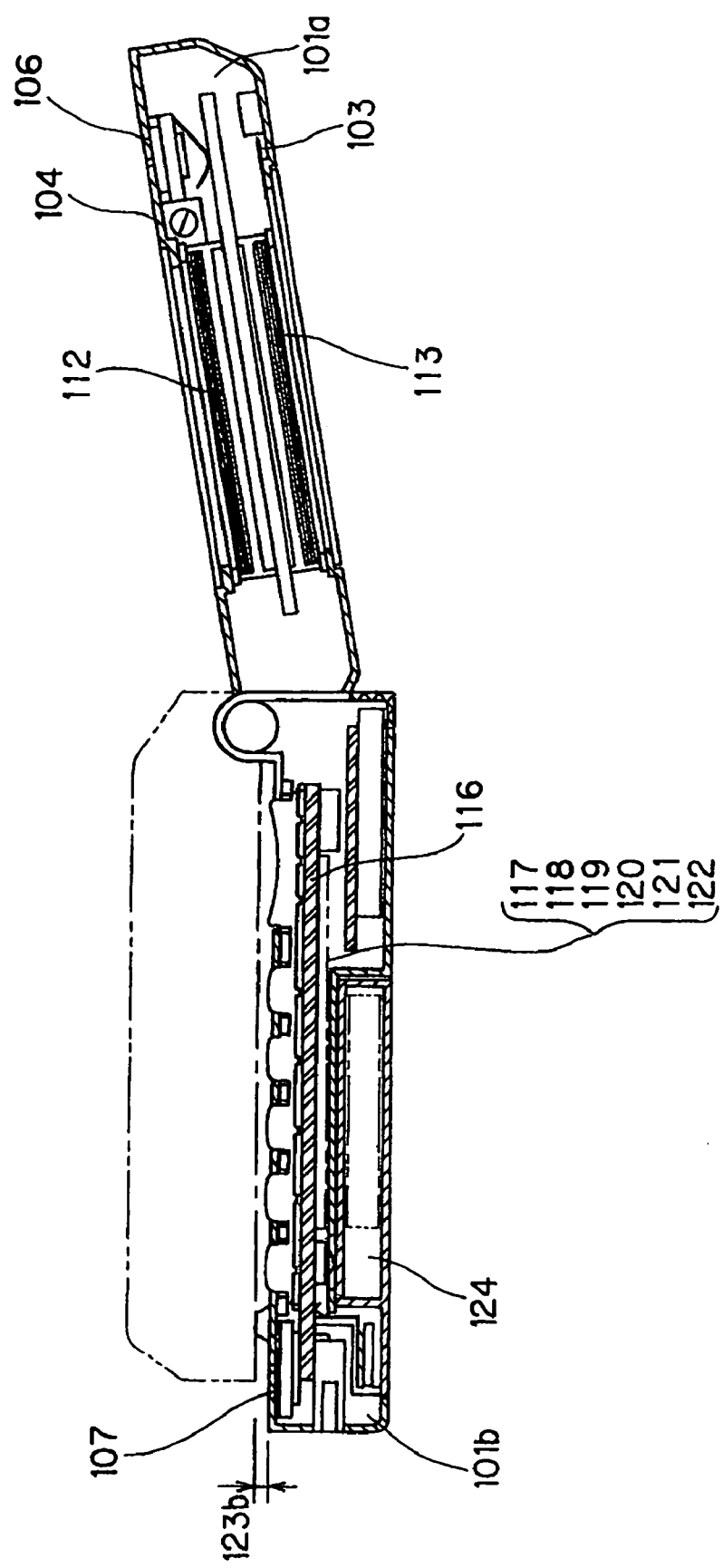
FIG. 4 is a cross-sectional view of the communication terminal according to the embodiment of the present invention.
Figure 5:
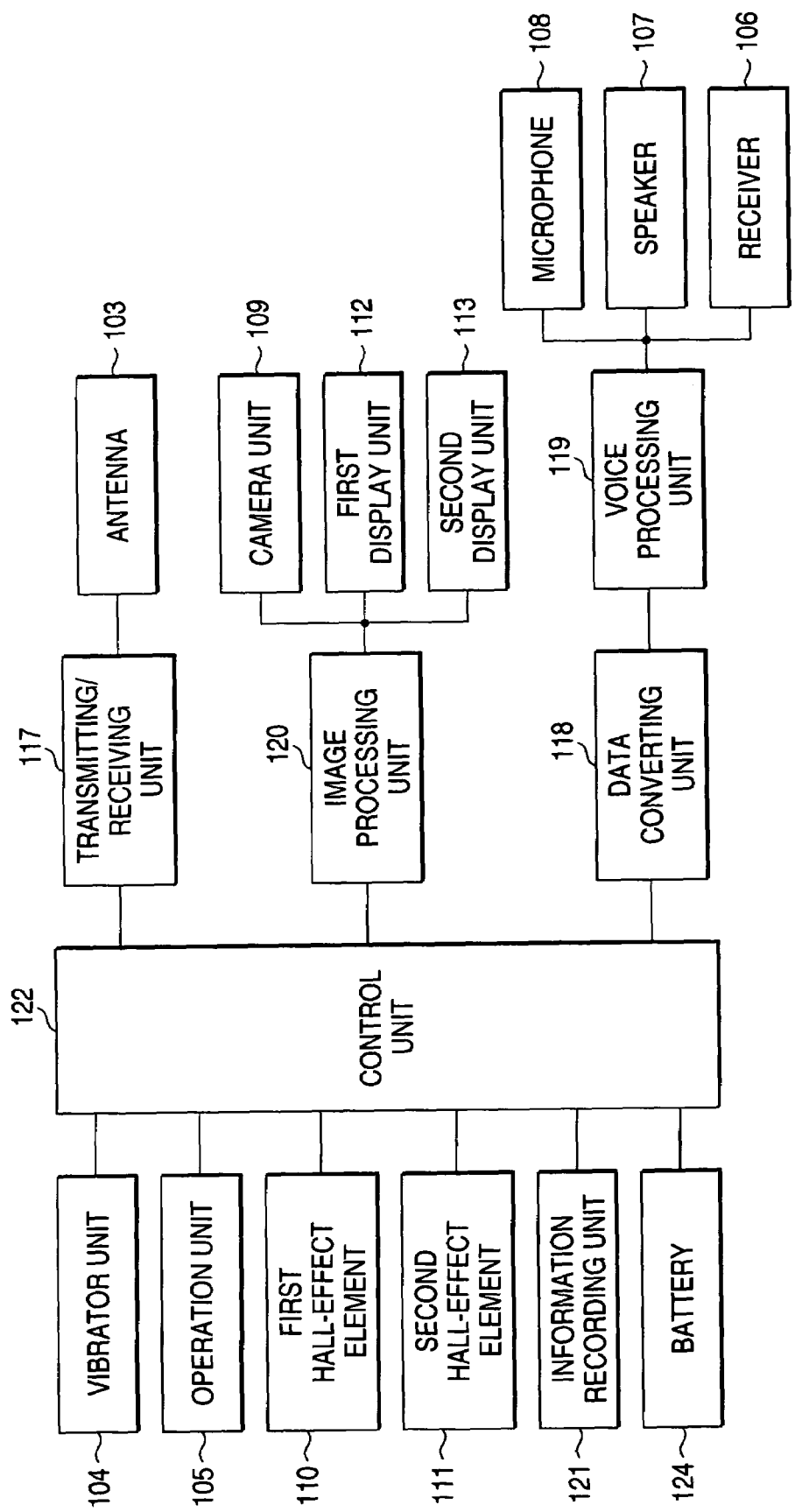
FIG. 5 is a block diagram for representing an electric arrangement of the communication terminal according to the embodiment of the present invention.

FIG. 1 is a perspective view for indicating a closed condition of a communication terminal according to an embodiment of the present invention. FIG. 2 is a perspective view for representing a first opened condition of the communication terminal according to the embodiment of the present invention. FIG. 3 is a perspective view for showing a second opened condition of the communication terminal according the embodiment of the present invention. FIG. 4 is a cross-sectional view of the communication terminal according to the embodiment of the present invention. FIG. 5 is a block diagram for representing an electric arrangement of the communication terminal according to the embodiment of the present invention.

As shown in FIG. 1 to FIG. 5, the opening/closing type communication terminal of this embodiment is arranged by employing a casing 101, a hinge portion 102, an antenna 103, a vibrator unit 104, an operation unit 105, a telephone receiving unit (receiver) 106, a speaker 107, a telephone speaking unit (microphone) 108, a camera unit 109, a first Hall-effect element 110, a second Hall-effect element 111, a first display unit 112, a second display unit 113, a first permanent magnet 114, a second permanent magnet 115, and also, a printed board 116. It should also be understood that the printed board 116 is provided with a transmitting/receiving unit 117, a data converting unit 118, a voice processing unit 119, an image processing unit 120, an information recording unit 121, and a control unit 122, as represented in FIG. 5.

Next, a description is made of respective structural elements which are owned by the communication terminal of this embodiment.

Figure 6:
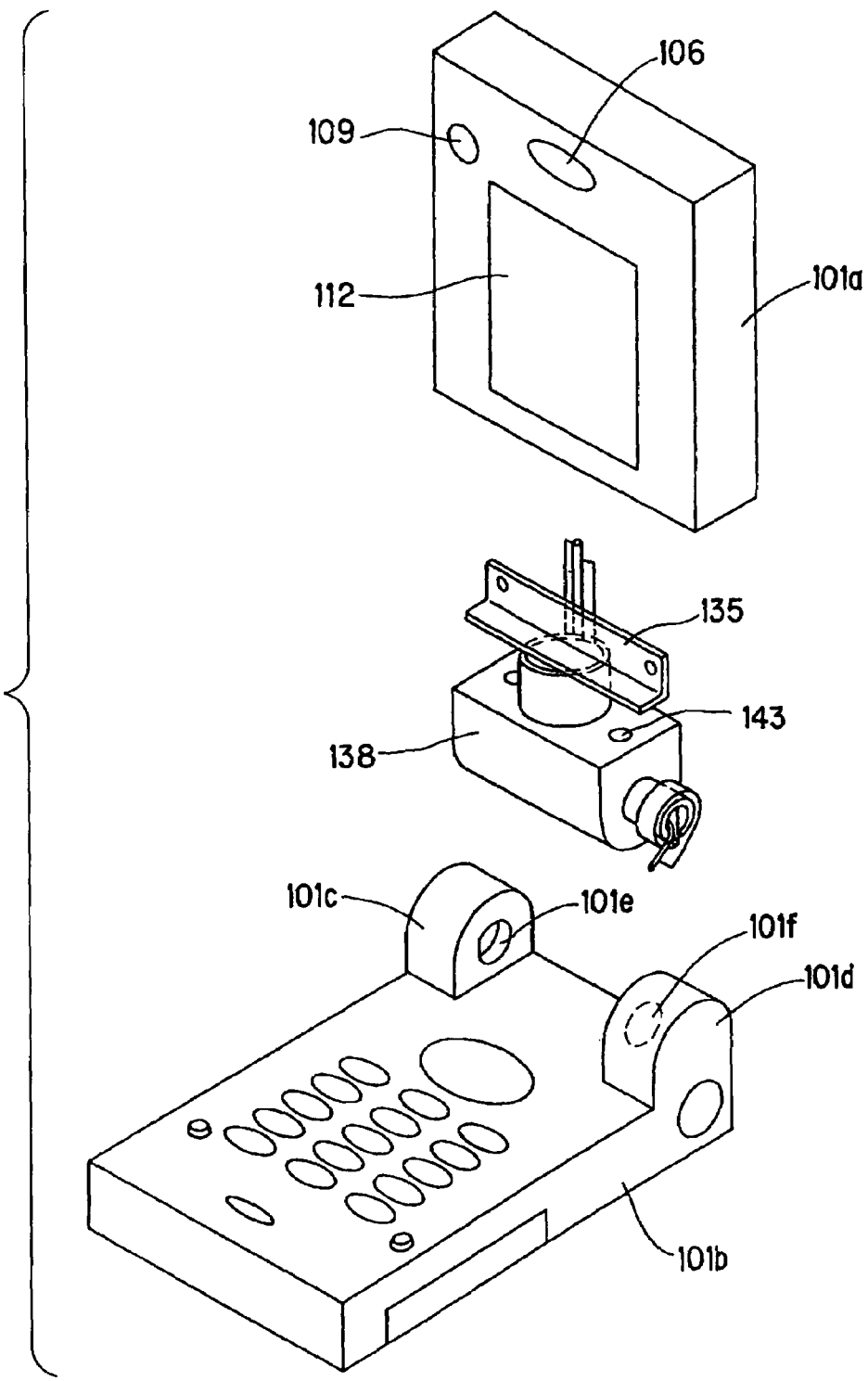
FIG. 6 is an exploded perspective view for showing a casing provided in the communication terminal of this embodiment.

First, a description is made of the casing 101. The casing 101 is constructed of a first casing member 101a and a second casing member 101b. FIG. 6 is an exploded perspective view for showing the casing 101 which is provided by the communication terminal of this embodiment. As indicated in this drawing, hinge mounting portions 101c and 101d which hold the hinge portion 102 have been formed on the second casing member 101b. A hole 101e having a "D"-shape is formed in the hinge mounting unit 101c, and a bearing portion 101f is formed in the hinge mounting portion 101d. The hole 101e is employed so as to hold the hinge portion 102. The bearing portion 101f supports the hinge portion 102.

As a result, the first casing member 101a and the second casing member 101b of the casing 101 can be opened/closed while the hinge portion 102 is used as an axis. It should be noted that the following conditions are defined in the below-mentioned description. That is, such a condition that the first casing member 101a is closed with respect to the second casing member 101b will be referred to as a "closed condition", whereas such a condition that the first casing member 101a is opened with respect to the second casing member 101b will be referred to as an "opened condition". Normally, when the communication terminal is portable, the communication terminal is used under the closed condition, whereas when the communication terminal is operated, the communication terminal is used under the opened condition. As shown in FIG. 2, such a condition that an angle defined between the first casing member 101a and the second casing member 101b is equal to approximately 180 degrees when the casing 101 under closed condition is opened will be referred to as a "first opened condition".

Also, as represented in FIG. 6, the first casing member 101a is coupled to the second casing member 101b in such a manner that both the first and second casing members 101a and 101b can be pivotably moved along a direction perpendicular to the open/close direction under opened condition. It should also be noted that the pivotable structure along this perpendicular direction will be described later. As shown in FIG. 3, such a condition that the first casing member 101a is rotated at an angle of approximately 180 degrees along a direction (S direction) which is located perpendicular to the open/close direction from the first opened condition will be referred to as a "second opened condition".

Also, in this embodiment, a projection 123b is formed on a surface of the second casing member 101b which abuts against the first casing member 101a when the communication terminal is under the closed condition. As a result, when the communication terminal is under the opened condition, a clearance 123b is formed between the first casing member 101a and the second casing member 101b.

Next, other structural elements will now be explained. As shown in FIG. 5, while the transmitting/receiving unit 117 is connected to the antenna 103, the transmitting/receiving unit 117 processes data received by the antenna 103, and then, transmits the processed data to the data converting unit 118. The data converting unit 118 converts the received data into voice data, and then, transmits the voice data to the voice processing unit 119. The voice processing unit 119 restores the voice data so as to produce a voice signal, and thereafter, transmits the voice signal to the receiver 106 and the speaker 107. Both the receiver 106 and the speaker 107 output voice in response to the reception signal supplied from the voice processing unit.

Also, the voice processing unit 119 encodes the voice received by the microphone 108 so as to produce voice data, and thereafter, transmits the produced voice data to the data converting unit 118. The data converting unit 118 converts the transmitted voice data into communication data, and thereafter, sends out the communication data to the transmitting/receiving unit 117. The transmitting/receiving unit 117 processes the received communication data, and then, transmits the processed communication data as a wireless electromagnetic wave signal from the antenna 103.

Also, as shown in FIG. 5, the camera unit 109, the first display unit 112, and the second display unit 113 are connected to the image processing unit 120. Also, the receiver 106, the speaker 107, and the microphone 108 are connected to the voice processing unit 119. This voice process unit 119 is connected to the data converting unit 118. The control unit 122 is connected to the vibrator unit 104, the operation unit 105, the first Hall-effect element 110, the second Hall-effect element 111, the transmitting/receiving unit 117, the data converting unit 118, and the information recording unit 121, and controls these structural elements. The control unit 122 is connected to the battery 124, and electric power is supplied from the battery 124 to the control unit 122.

The vibrator unit 104 is such a unit for notifying a telephone call by way of vibration when the telephone call is received by energizing this vibrator unit 104. Also, the operation unit 105 is used to perform a telephone calling operation and a completion of a telephone communication; to control sound volumes of the receiver 106 and the speaker 107; to enter a character, a symbol, and a number; and to operate the camera unit 109.

Both the first display unit 112 and the second display unit 113 may be arranged by a liquid crystal display device, or the like, and are employed so as to display thereon a character, a symbol, a number, an image, a map, and the like. The first display unit 112 is provided on a side plane of the first casing member 101a, while the first casing member 101a is located opposite to the operation unit 105 when the casing 101 is closed, and is exposed when the casing 101 is opened. Also, the second display unit 113 is provided on another side plane (rear plane) located opposite to the side plane where the first display unit 112 is provided.

As indicated in FIG. 2, the camera unit 109 is provided in such a manner that this camera unit 109 is located adjacent to the first display unit 112 so as to image a forward scene of the first display unit 112. Incident light which is captured by the camera unit 109 and traveled from a photographic object is converted from an optical signal into an electric signal, so that image information is produced. This image information is processed by the image processing unit 120, and thereafter, is displayed on either the first display unit 112 or the second display unit 113. It should also be noted that when a predetermined operation is carried out, the image information is recorded on the image recording unit 121. In addition to the image information, the information recording unit 121 may record thereon telephone number information, voice information, image information (namely, received image information etc.) other than the image information of the photographed image, and character information such as a mail under forming operation, or a mail which is transmitted/received.

The speaker 107 is such a unit for notifying a telephone call to a user by outputting telephone call receiving sound when the telephone call is received. Since the speaker 107 is provided on the edge portion side of the position located apart from the hinge mounting portions 101c and 101d of the speaker 107, the speaker 107 outputs voice toward the first casing member 101a located opposite to the speaker 107 when the casing 101 is set to the closed condition. It should be noted that the speaker 107 can output voice, the sound volume of which is larger than that of the receiver 106 when the communication terminal is operated in a hand free mode, and in a TV telephone mode.

The receiver 106 is employed so as to output voice in the case that the communication terminal of this embodiment is used as the normal portable telephone. The voice produced from the receiver 106 is outputted toward the front area of the first display unit 112, and the receiver 106 is provided on the edge portion side of the first casing member 101a which is located opposite to the speaker 107 when the casing 101 is set to the closed condition. When the communication terminal is operated in the reception mode, the user sets the casing 101 to the first opened condition, and after a predetermined operation is carried out, the user listens to voice by touching an ear of this user on the receiver 106. Also, the microphone 108 is provided in the vicinity of the hinge mounting portion 101d of a major plane 101g of the second casing member 101b.

The first permanent magnet 114 is provided in the vicinity of the first display unit 112 of the first casing member 101a. The first Hall-effect element 110 is provided in the second casing member 101b in such a manner that this first Hall-effect element 110 is located opposite to the first permanent magnet 114 when the casing 101 is under the closed condition. Also, the second permanent magnet 115 is provided within the hinge portion 102. The second Hall-effect element 110 is provided in the first casing member 101a in such a manner that this second Hall-effect element 111 is located opposite to the second permanent magnet 115 when the casing 101 is under the closed condition, and also, under the first opened condition.

When the casing 101 is under the closed condition, since the first permanent magnet 114 is located in the vicinity of the first Hall-effect element 110, this first Hall-effect element 110 detects the first permanent magnet 114 and supplies a detection signal to the control unit 122. When the casing 101 is not under the closed condition (namely, first and second opened conditions), since the first permanent magnet 114 is separated from the first Hall-effect element 110, this first Hall-effect element 110 cannot detect the first permanent magnet 114, so that the first permanent magnet 114 does not produce a detection signal.

Also, when the casing 101 is under the closed condition and under the first opened condition, since the second permanent magnet 115 is located in the vicinity of the second Hall-effect element 111, this second Hall-effect element 111 detects the second permanent magnet 115 and supplies a detection signal to the control unit 122. When the casing 101 is under the second opened condition, since the second permanent magnet 115 is separated from the second Hall-effect element 111, this second Hall-effect element 111 cannot detect the second permanent magnet 115, so that the second permanent magnet 115 does not produce a detection signal. In other words, the control unit 122 can recognize both the opened/closed conditions and the pivotable condition of both the first casing member 101a and the second casing member 101b by checking as to whether or not the control unit 122 receives the detection signals sent from the first Hall-effect element 110 and the second Hall-effect element 111. It should be understood that a condition detecting member defined in the claim corresponds to the first and second Hall-effect elements 110 and 111, and the control unit 122.

Figure 7:
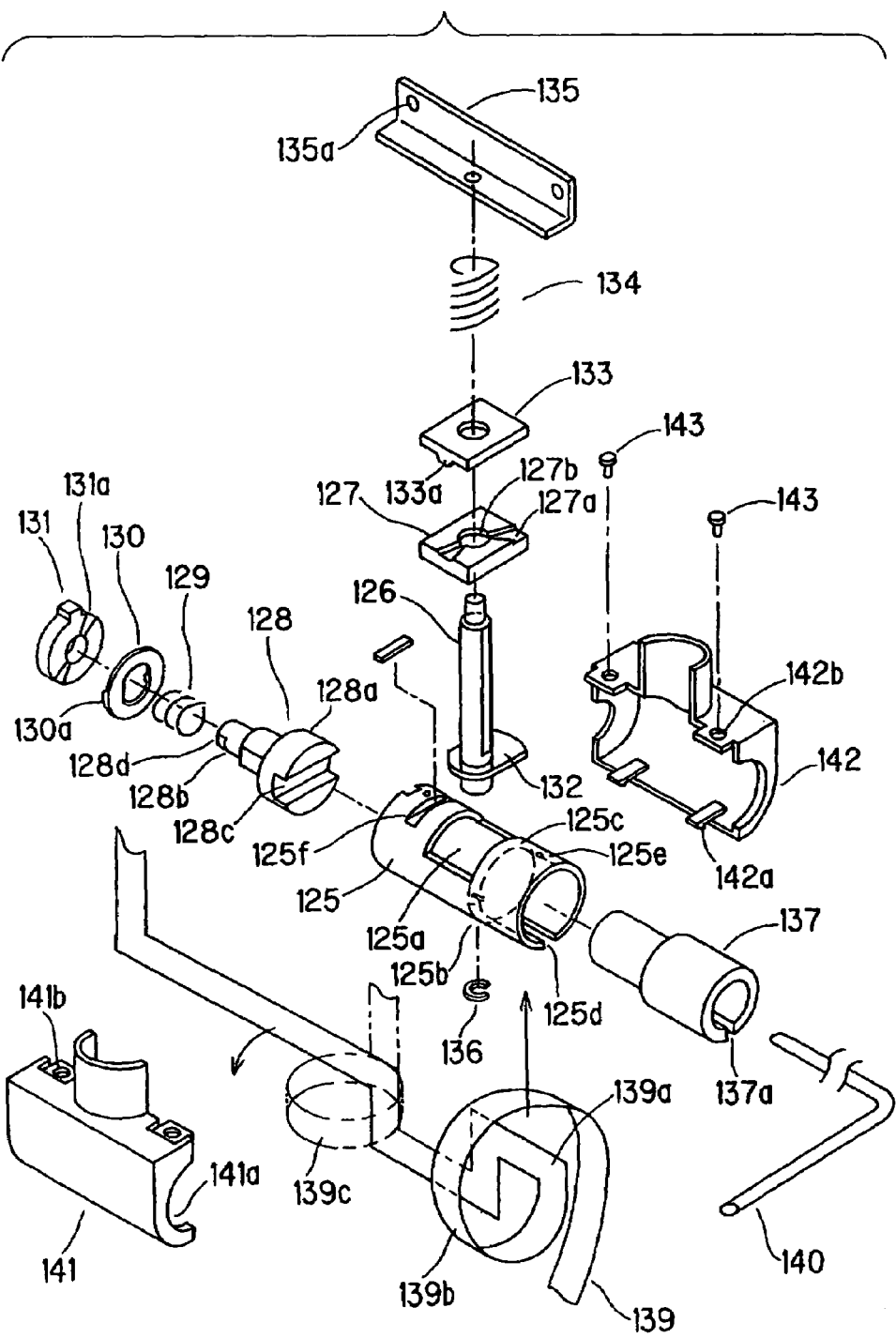
FIG. 7 is an exploded perspective view for showing a hinge portion indicated in FIG. 6.
Figure 8:
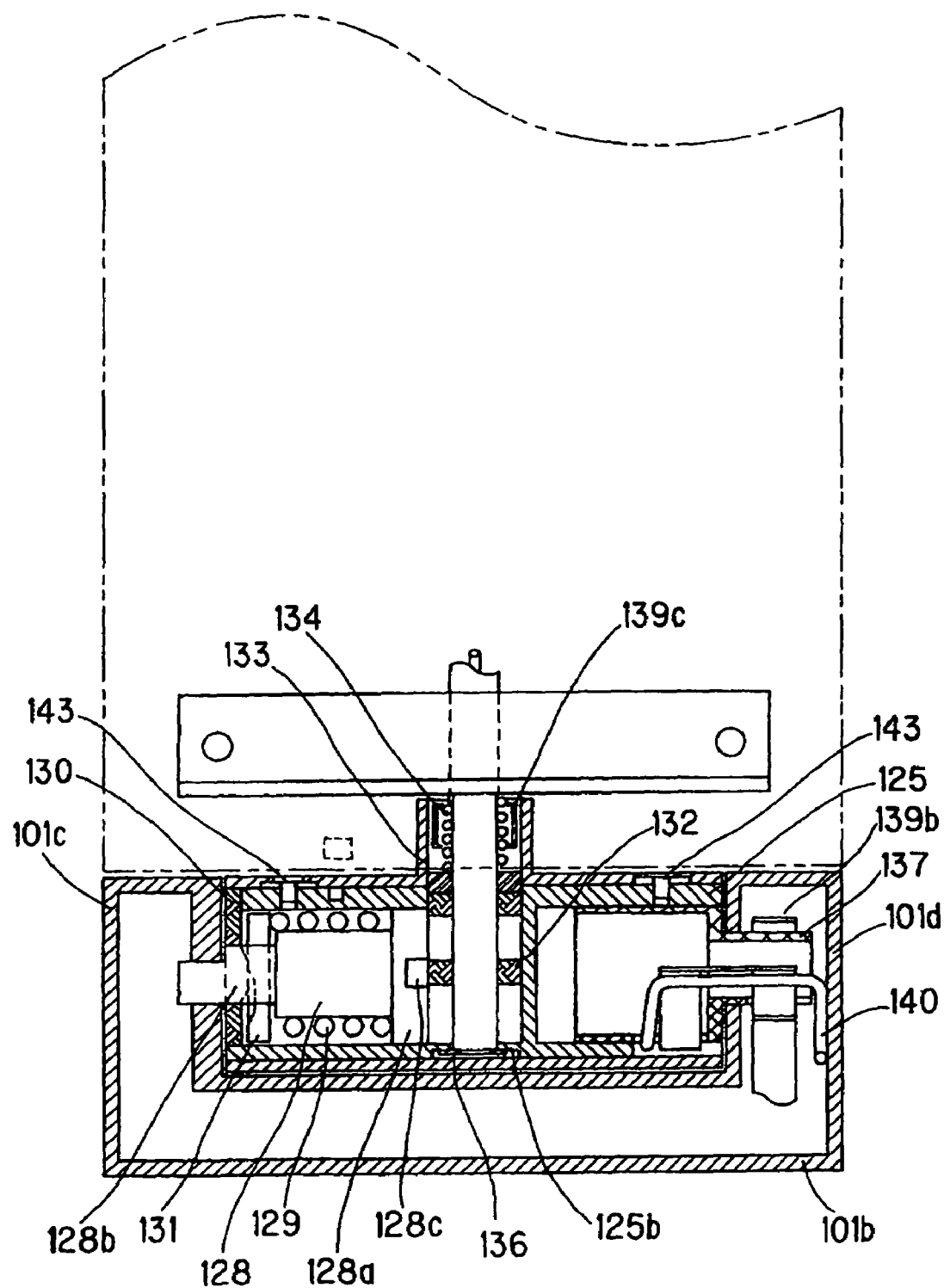
FIG. 8 is a sectional view of the hinge portion under the first opened condition of the casing.
Figure 9:
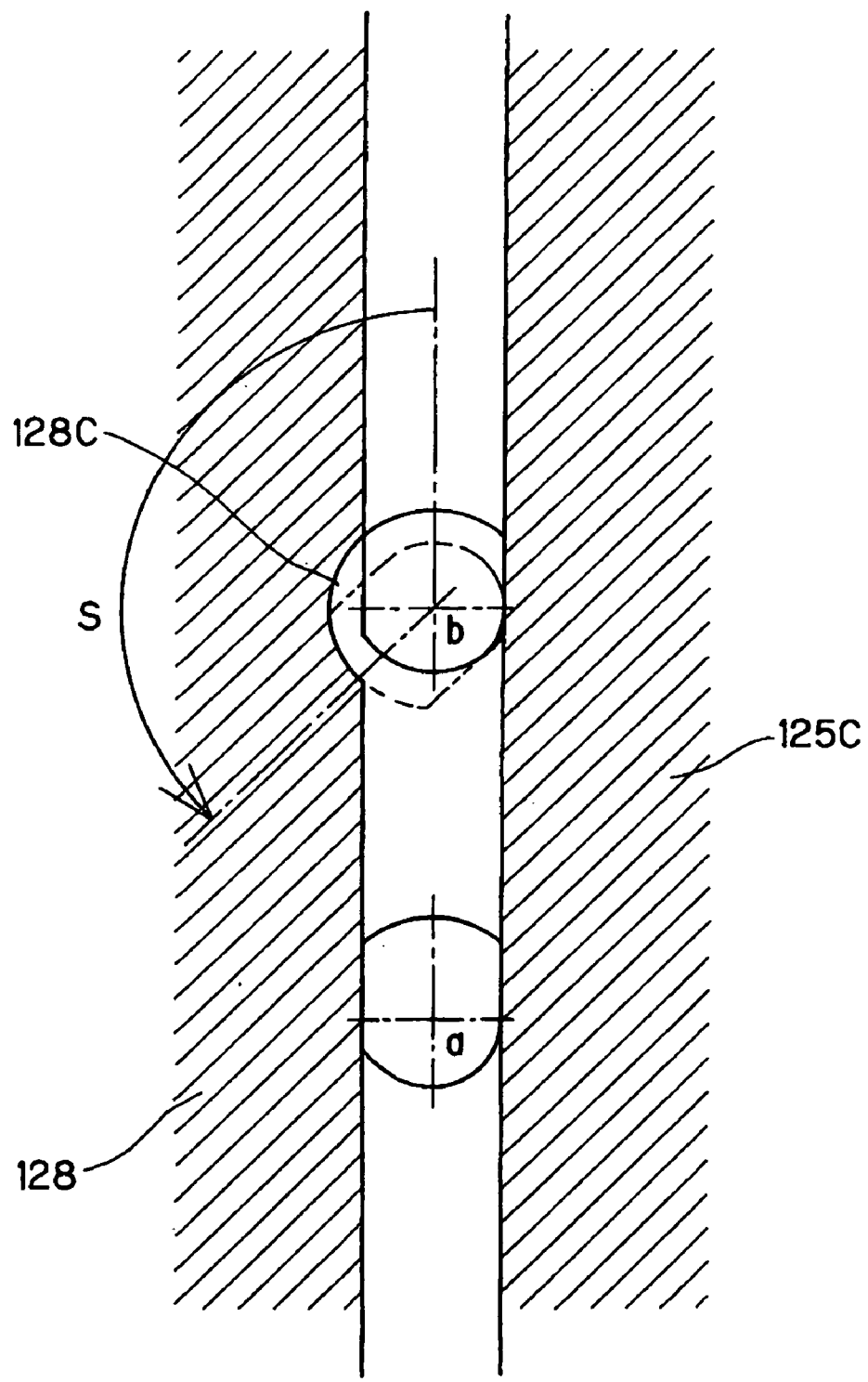
FIG. 9 is an explanatory diagram (cam diagram) for explaining operations of a cam which is mounted on the hinge portion.

Next, the hinge portion 102 will now be described in detail with reference to FIG. 6 to FIG. 9. FIG. 6 is an exploded perspective view showing a casing provided in the communication terminal of this embodiment. FIG. 7 is an exploded perspective view showing the hinge portion indicated in FIG. 6. FIG. 8 is a sectional view of the hinge portion under the first opened condition of the casing. FIG. 9 is an explanatory diagram (cam diagram) for explaining operations of a cam which is mounted on the hinge portion.

As shown in FIG. 6 to FIG. 8 the hinge portion 102 provided on the communication terminal of this embodiment includes a hinge unit 132 which has a first rotating shaft 125, a second rotating shaft 126, a supporting plate 127, a guide shaft 128 which corresponds to a pivotable operation restricting member recited in the claim, a first coil spring 129, a first click convex plate 130, a first click concave plate 131, a cam 132, a second click convex plate 133, a second coil spring 134, a bracket 135, an E ring 136, and a first rotating shaft bearing 137. This hinge portion 102 further includes a flexible board 139, a cable 140, a front cover 141 and a rear cover 142 which correspond to a cover member recited in the claim, and a fastening screw 143.

The hollow-shaped first rotating shaft 125 has a supporting portion 125b, a partition portion 125c, a slit 125d, a screw hole 125e, and a second permanent magnet holding portion 125f. The supporting portion 125b supports both a notch portion 125a and the second rotating shaft 126 at a center portion thereof. It should also be noted that the supporting plate 127 is set to the notch portion 125a. In the supporting plate 127, both a concave portion 127a and a supporting hole 127b for supporting the second rotating shaft 126 have been formed. The guide shaft 128, the first coil spring 129, the first click convex plate 130, and the first click concave plate 131 are mounted inside the first rotating shaft 125 from the left side as viewed in FIG. 7.

The guide shaft 128 has both a large diameter portion 128a and a small diameter portion 128b. While a parallel groove 128c is formed in the large diameter portion 128a, a D-cut portion 128d is formed on a tip portion of the small diameter portion 128b. The first click convex plate 130 is provided in such a manner that this first click convex plate 130 cannot be pivotably moved with respect to the guide shaft 128, but can be moved only along a thrust direction of the small diameter portion 128b. Also, the first click concave plate 131 is penetrated in such a manner that the small diameter portion 128b can be pivotably moved, and is fixed on the edge portion side of the first rotating shaft 125.

The first coil spring 129 energizes the first click convex plate 130 to the side of the first click convex plate 131. When the casing 101 is under the closed condition and under the first opened condition, the convex portion 130a of the first click convex plate 130 is engaged with the convex portion 131a of the first click convex plate 131. It should be understood that when the condition of the casing 101 is changed from the first opened condition to the closed condition, the engagement between the convex portion 130a and the concave portion 131a is released. On the other hand, when the condition of the casing 101 is changed from the closed condition to the first opened condition, the convex portion 130a is engaged with the concave portion 131a. In other words, as a result, when the convex portion 130a is engaged with the concave portion 131a, or the engagement between these two portions 130a and 131a is released, the user can have a click feeling.

The cam 132, the supporting plate 127, the second click convex plate 133, the second coil spring 134, and the bracket 135 are mounted on the second rotating shaft 126 from a middle stage to an upper side of FIG. 7. The second rotating shaft 126 is supported by the supporting plate 127 mounted on the notch portion 125a of the first rotating shaft 125, and also by the supporting portion 125b of the first rotating shaft 125. The E ring 136 is provided on the tip portion of the second rotating shaft 126, and is held by the first rotating shaft 125 in a pivotable manner. The second click convex plate 133 is provided in such a manner that the second click convex plate 133 can be moved only along the thrust direction of the second rotating shaft 126. Also, the second coil spring 134 energizes the second click convex plate 133 to the side of the supporting plate 127.

Only in such a case that the condition of the casing 101 is changed from the closed condition up to the first opened condition, or is set to the second opened condition, the convex portion 133a of the second click convex plate 133 is engaged with the convex portion 127a of the supporting plate 127. When the condition of the casing 101 is transferred from the first opened condition to the second opened condition, the engagement established between the convex portion 133a of the second click convex plate 133 and the concave portion 127 of the supporting plate 127 is released, and then, when the casing 101 is under the second opened condition, the convex portion 133a is engaged with the concave portion 127a. In other words, similar to the above-described convex portion 130a of the first click convex plate 130 and the concave portion 131a of the first click concave plate 131, the above-explained structural members are constructed which may give a clicking feeling to the user.

A hole 135a which is fastened and fixed to the first casing member 101a by a screw (not shown) is formed in the bracket 135.

The cam 132 is fixed to the second rotating shaft 126, and is stored in the first rotating shaft 125 in such a manner that the cam 132 is sandwiched between the partition portion 125c of the first rotating shaft 125 and the large diameter portion 128a of the guide shaft 128. Both the cam 132 and the parallel groove 128c of the guide shaft 128 is constituted in such a way that when the casing 101 is under the closed condition, the cam 132 is intersected in the parallel groove 128c, whereas when the casing 101 is under the first opened condition, the cam 132 is positioned parallel to the parallel groove 128c. Under the first opened condition, the cam 132 which is pivotably moved in conjunction with the rotating movement of the sound rotating shaft 125 can be guided with the parallel groove 128c, so that the first casing member 101a can be pivotably moved along an S direction. Now, the above-described movement will be explained by using the cam diagram shown in FIG. 9.

In the cam diagram shown in FIG. 9, a hatched portion of a right side indicates the partition portion 125c. Also, a hatched portion of a left side shows the large diameter portion 128a of the guide shaft 128, and an arc portion shows the parallel groove 128c. In this case, such a position of the cam 132 when the casing 101 is under the closed condition is indicated by a position "a". Also, such a position of the cam 132 when the casing 101 is under the opened condition is indicated by another position "b".

At the position "a", since both a right edge plane and a left edge plane of the cam 132 are surrounded by the partition portion 125c and the large diameter portion 128a of the guide shaft 128, the cam 132 cannot be pivotably moved. At the position "b", since the partition portion 125c is positioned on the side of the right edge plane of the cam 132, this cam 132 cannot be pivotably moved to the opposite side with respective of the S direction. Since the parallel groove 128c is present on the side of the left edge plane of the cam 132, this cam 132 can be pivotably moved by an angle of 180 degrees along the S direction. Under such a condition that the cam 132 is pivotably moved by the angle of 180 degrees along the S direction (namely, second opened condition), a portion of the cam 132 is located within the parallel groove 128c. Under this condition, since a thick thickness direction of the cam 132 is surrounded by the parallel groove 128c, even if the casing 101 is tried to be changed into the closed condition, this casing 101 is restricted.

As a consequence, while the condition of the casing 101 is defined from the closed condition up to the opened condition, the first casing member 101a cannot be pivotably moved while the second rotating shaft 126 is used as an axis. Also, under the first opened condition, although the first casing member 101a can be pivotably moved up to the angle of 180 degrees along the S direction, the first casing member 101a cannot be pivotably moved along the direction opposite to the S direction. Furthermore, while the condition of the casing 101 is defined from both the second opened condition and the first opened condition to the second opened condition, since the first rotating shaft 125 cannot be pivotably moved, the casing 101 cannot be opened and closed.

The hollow-shaped first pivotable shaft bearing 137 is mounted inside the first rotating shaft 125 from a right side of the middle stage in FIG. 7. The groove 137a of this first rotating shaft bearing 137 is formed toward the same direction as that of the slit 125d.

Both the flexible board 139 and the cable 140 are assembled in the hinge unit 138. The flexible board 139 having the corner portion 139a causes the first casing member 101a to be electrically connected to the second casing member 101b. One edge side of the corner portion 139a is wound around the first rotating shaft bearing 137 to form the first winding portion 139b, and the corner portion 139b is penetrated from the groove 137a to the first rotating shaft bearing 137. The other edge side of the corner portion 139a passes through the slit 125d, and then, is escaped from the first rotating shaft 125, and thereafter, is wound around the first rotating shaft 125 by an approximately half turn. Further, the other edge side of this corner portion 139a is wounded around the second rotating shaft 126 to form the second winding portion 139c, and then, is connected to the first casing member 101a.

The cable 140 which is used to electrically connect the antenna 103 provided in the first casing member 101a to the transmitting/receiving unit 117 provided in the second casing member 101b passes through the first rotating shaft bearing 137 from the edge portion of the first rotating shaft bearing 137, is derived from the slit 125, and then, is extended to the side of the first casing member 101a. Thereafter, the cable 140 penetrates through the inside of the second winding portion 139c, and is connected to the antenna 103.

After both the flexible board 139 and the cable 140 have been assembled in the hinge unit 138, both the front cover 141 and the rear cover 142 used for an outer decoration are fixed by the fastening screw 143. Engaging claws 141a and 142a have been provided on the front cover 141, and screw penetrations holes 141b and 142b have been provided in the rear cover 142. Both the screw penetration holes 141b and 142b have been provided in such a manner that the screw penetration holes 141b and 142b are directed toward the bracket 134 provided on the second rotating shaft 126. Also, both the front cover 141 and the rear cover 142 are constructed in such a manner that the engaging claws 141a and 142a are engaged with each other by sandwiching the hinge unit 138, and the fastening screw 143 is screwed through the screw penetrating holes 141b and 142b to the screw hole 125e of the first rotating shaft 125, so that the hinge portion 102 is completed.

The D-cut portion 128d formed on the tip portion of the small diameter portion 128b is supported by the D-shaped hole 101e formed in the hinge mounting portion 101c of the second casing member 101b. Also, an outer peripheral portion of the first rotating shaft bearing 137 is supported to the bearing portion 101f of the hinge mounting portion 101d of the second casing member 101b, so that the hinge portion 102 is mounted on the second casing member 101b. Also, the first casing member 101a is mounted on the bracket 135.

In the communication terminal constituted in the above-described manner, according to this embodiment, the user can use the communication terminal by touching his ear to the receiver 106, or can use the communication terminal by holding this communication terminal by his hand in the hand free manner under the first opened condition. Also, in the case that the user reads the mails and/or enter the characters, the user holds the communication terminal in such a manner that both the operation unit 105 and the first display unit 112 are faced to the user side. At this time, even when the user holds the communication terminal by his right hand, or his left hand, the speaker 107 is not covered, so that the user can clearly listen to the voice produced from the speaker 107.

Figure 10:
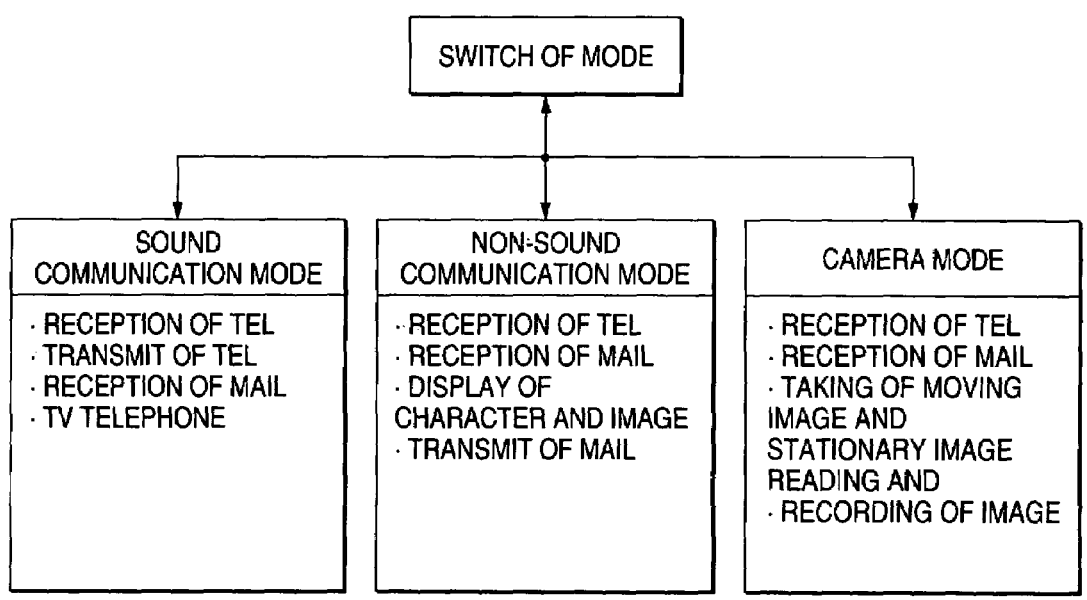
FIG. 10 is an explanatory diagram for explaining functions as to various modes of the communication terminal according to the embodiment of the present invention.
Figure 11:
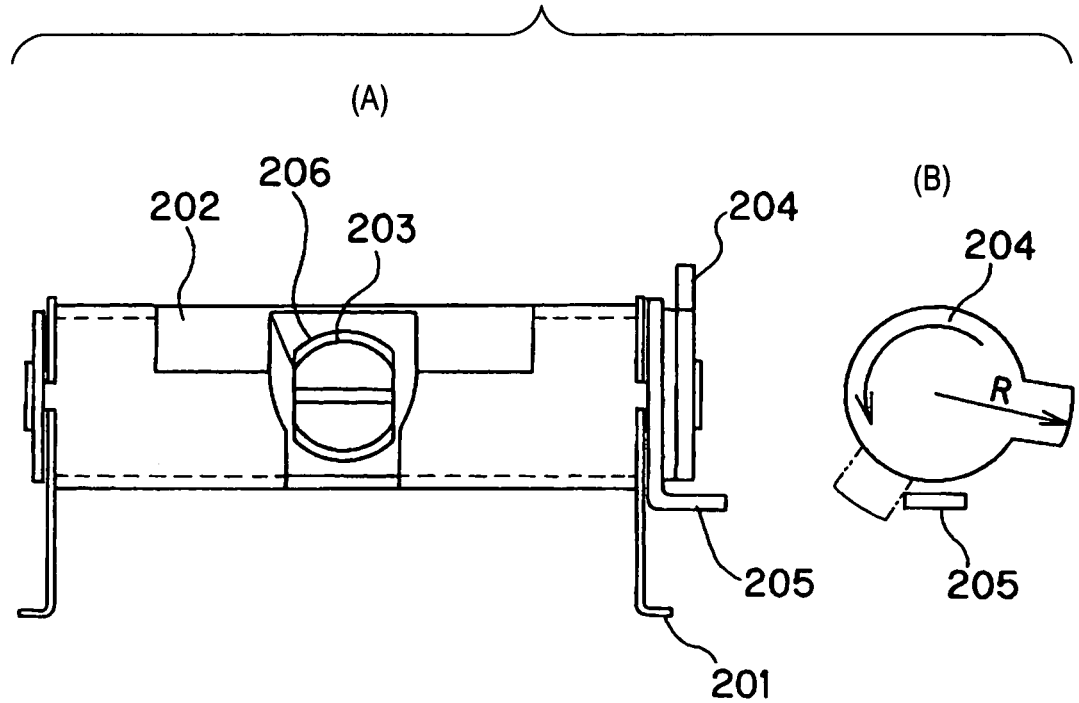
FIG. 11(A) is the plan view of the hinge apparatus and FIG. 11(B) is the side view of the hinge apparatus disclosed in JP-A-2000-240636.
Figure 12:
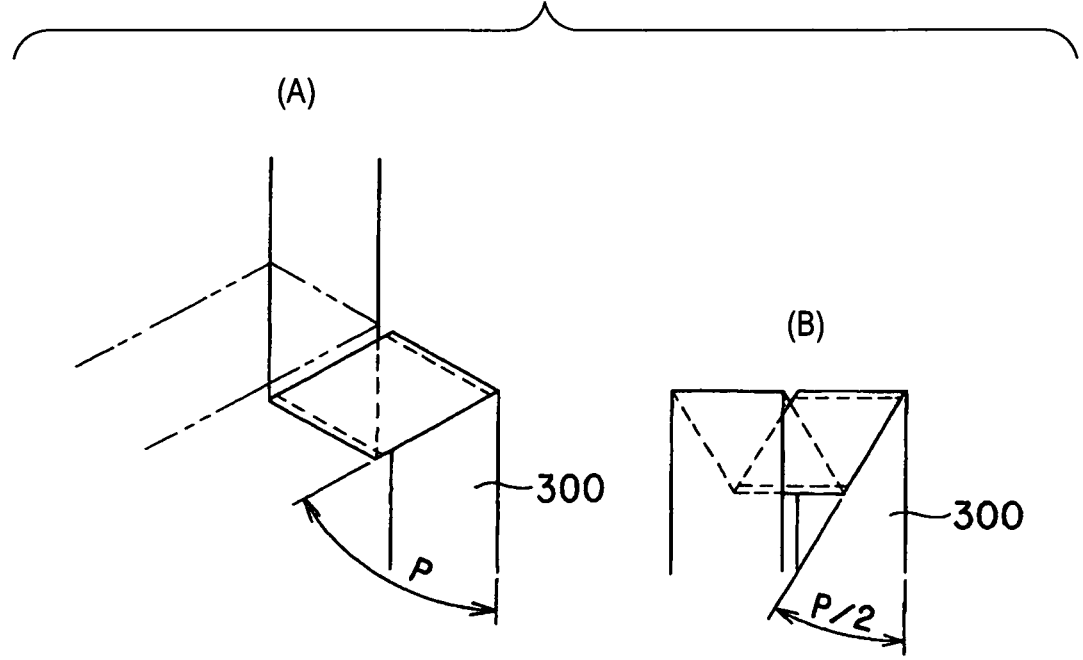
FIG. 12 is the plan view for showing the flexible printed board which penetrates through the conventional hinge portion.

Next, operations of the communication terminal of this embodiment will now be described with reference to FIG. 1 to FIG. 10. FIG. 10 is an explanatory diagram for explaining functions as to various operation modes of the communication terminal according to one embodiment of the present invention. As indicated in this drawing, under such a condition that the power supply of the communication terminal of this embodiment is turned ON, this communication terminal is arranged in such a manner that a voice communication mode is commenced, the operation unit 105 is manipulated so as to execute a mode switching operation, and the respective function operations can be carried out in either a non-voice communication mode or a camera mode.

In the voice communication mode, telephone call receiving operations of the voice communication and the non-voice communication are commenced. Since a call receiving operation of voice and a telephone calling operation of voice are performed, the user can make a telephone communication with a telephone counter party. Under the call receiving condition, a time instant and the like are displayed on the second display unit 113 when the casing 101 is under the closed condition, or on the first display unit 112 when the casing 101 is under the opened condition. In the case that a telephone call is received, the indications of the time instant and the like disappear, and a telephone number of a telephone counter party is displayed. If the telephone number of the telephone counter party is previously registered in a telephone directory in combination with a name of this telephone counter party, then the name of this telephone counter party is displayed. Thereafter, since the operation unit 105 is operated, a telephone communication can be started.

In the non-voice communication mode, while the call waiting condition is maintained, character information entered from the operation unit 105 is displayed on the first display unit 112, and also, both the character information and voice, non-voice (image etc.) information which have been stored in the information recording unit 121 can be transmitted by employing a communication function.

In the case that the casing 101 is opened when this character information, the voice, or the non-voice information is received, a message for notifying the reception of the relevant information is displayed on the first display unit 112, whereas in the case that the casing 101 is closed when this character information, the voice, or the non-voice information is received, a message for notifying the reception of the relevant information is displayed on the second display unit 113. Also, character information and image information can be displayed on both the first display unit 112 and the second display unit 113 by executing a predetermined operation by the user. It should also be noted that when either the voice communication or the non-voice communication is carried, the telephone directory function can be utilized so as to define a telephone communication counter party. That is to say, a name of the telephone counter party is displayed on the first display unit 112 by employing the telephone directory function, and then, the name can be selected to be defined.

In the camera mode, a photographing operation by the camera unit 109 may be carried out both under the first opened condition and the second opened condition. When the user himself on the side of the first display unit 112 is photographed under the first opened condition, since a mirror image is displayed on the first display unit 112, the user is brought into such a condition that the user watches the mirror. Moreover, if the user pivotably moves the first casing member 101a and sets the casing 101 to the second opened condition in order to photograph a person (photographic object) in front of the user, a mirror image is displayed on the first display unit 112, and an inverted mirror image is displayed on the second display unit 113. As a result, the user can make a confirmation by viewing the inverted mirror image displayed on the second display unit 113. On the other hand, the person in front of the user, who is the photographic object, can confirm how the own image is photographed by viewing the above-explained mirror image displayed on the first display unit 112.

Since the user who performs a photographing operation views a photographed image displayed on the second display unit 113, the user can view how the image is photographed. Also, in such a case that a photographed image under photographing operation is not wanted to be viewed by a person in front of a user, the user can set the photographed image displayed on the first display unit 112 under the second opened condition to the non-display mode by manipulating the operation unit 105.

Also, a photographed image can be recorded in the information recording unit 112 as either a still image or a moving picture. When the moving picture/still image recorded in the information recording unit 121 are reproduced, the user can display the photographed image on the first display unit 112 and can view this displayed image by performing a predetermined operation. This photographed image can be stored in the telephone directory in relation to the telephone number information. In such a case that a telephone call is received from the telephone number related to the image information, when the casing 101 is under the closed condition, the inverted mirror image of the photographed image is displayed on the second display unit 113, whereas the inverted mirror image of the photographed image is displayed on either the first display unit 112 or the second display unit 113 when the casing 101 is under the opened condition. In other words, even if the mirror image is displayed during the photographing operation, when the recorded image is read out, the inverted mirror image is displayed. Also, the image photographed by the camera unit 109 can also be transmitted to the communication counter party.

In any of these modes, when a telephone call is received, the telephone call receiving sound is outputted from the speaker 107 in order to notify this telephone call reception. At this time, even when the casing 101 is under the closed condition, since the telephone call receiving sound outputted from the speaker 107 is conducted out from the casing 101 through the clearance 123, the user can clearly hear the telephone call receiving sound. Also, when the casing 101 is under the opened condition, since the front area of the speaker 107 is opened, there is no possibility that the user can hardly hear the telephone call receiving sound. Further, in the case that the communication terminal is set to the manner mode, it is so arranged that only the vibrator unit 104 is operated without outputting the telephone call receiving sound, and the casing 101 is vibrated only for a predetermined time duration.

Next, a description is made of rotating movement of the casing 101.

When the casing 101 under closed condition is opened, the casing 101 is pivotably moved while the axis center of the first rotating shaft 125 is set as a center. At this time, since the turn number of the first winding portion 139*b* of the flexible board 139 is decreased by such a number that the first rotating shaft bearing 137 which is pivotably moved in combination with the first rotating shaft 125 is pivotably moved, bending stress produced on the flexible board is also decreased. Since the cable 140 is arranged substantially coincident with the axis center of the first rotating shaft 125, the bending stress is not increased, or decreased, but only twist stress is produced. Also, when the condition of the casing 101 is returned from the first opened condition to the closed condition, the operation when the casing 101 is opened from the closed condition is carried out in a reverse sense.

When the first casing member 101*a* is pivotably moved by an angle of 180 degrees along the S direction so as to change the condition of the casing 101 from the first opened condition to the second opened condition, the turn number of the second winding portion 139*c* of the flexible board 139 is increased/decreased by such a turn number that the second rotating shaft 126 is pivotably moved. Since the flexible board 139 merely increases and decreases the turn number, only bending stress is increased/decreased, and twist stress is not produced. Since the cable 140 is wound on the second rotating shaft 126 only by such a distance that the second rotating shaft 126 is pivotably moved, since the diameter of the second rotating shaft 126 is smaller than that of the first rotating shaft 125, the radius of curvature when the cable 140 is wound is also small, and thus, it is possible to avoid an occurrence of large bending stress.

In other words, since the flexible board 139 forms the first winding portion 139*b* and the second winding portion 139*c* while the axis centers of the first rotating shaft 125 and the second rotating shaft 126 are set to the centers, even when both the first and second rotating shafts 125 and 126 are pivotably moved, only the radiuses of curvature and the turn numbers of the first and second winding portions 139*b* and 139*c* are changed. As a result, when the first and second rotating shafts 125 and 126 are pivotable moved, since both tensile stress and flexure which are produced in the flexible board 139 are absorbed by the first and second winding portions 139*b* and 139*c*, only the bending stress is changed, and it is possible to avoid an occurrence of twist stress.

When the casing 101 is set under the closed condition, the first opened condition, and the second opened condition, since the head portion of the fastening screw 143 is located opposite to the first casing member 101*a*, the fastening screw 143 is hidden by the first casing member 101*a*. Only when the casing 101 is pivotably moved from the first opened condition to the second opened condition, the head of the fastening screw 143 is exposed. However, since the user uses the communication terminal in the respective modes, the communication terminal is not operated while the casing 101 is being pivotably moved under which the fastening screw 143 is exposed. As a consequence, it is possible to avoid that a grade of an outer appearance is deteriorated by that the fastening screw 143 is exposed under the closed condition, and also, under the normal use condition (opened condition). In particular, even when a photograph of the communication terminal appears on a magazine, a catalog, and the like, since the fastening screw 143 does not appear, the design characteristic thereof is not deteriorated.

It should also be understood that in this embodiment, the projection 123*a* is formed on the surface of the second casing member 101*b* in order to form the clearance 123*b* between the first casing member 101*a* and the second casing member 101*b* when the casing 101 is under the closed condition. Alternatively, a similar projection may be formed on the first casing member 101*a*, or on other structural members. Also, another method may be alternatively employed, for example, a cover member used to hide a screw for fastening the first casing member 101*a* may be alternatively projected from the surface of the first casing member 101*a*. Even when the casing 101 is under the closed condition, in order that the voice outputted from the speaker 107 can be conducted outside the casing 101, the clearance 123*b* may be alternatively formed between the casing member where the speaker 107 is provided and another casing member located opposite to the first-mentioned casing member.

As previously explained, in accordance with the opening/closing type communication terminal of this embodiment, since the cover members (front cover 141 and rear cover 142) are pivotably moved at the same time in connection with the rotating movement of the first rotating shaft 125, the cover members can be continuously made in close contact to the first rotating shaft 125. As a consequence, since no clearance is produced between the first rotating shaft 125 and the cover members when the casing member 101 is pivotably moved while the first rotating shaft 125 is set as the shaft, it is possible to avoid that rain and the like are penetrated. Also, since the pivotable angle of the second rotating shaft 126 is restricted by the member which is provided inside the first rotating shaft 125, the rotation radius can be made small. As a result, the hinge portion 102 can be made compact.

Also, when the second rotating shaft 126 is pivotably moved from the first opened condition by the angle of 180 degrees and then is brought into the second opened condition, since the rotating movement of the first rotating shaft 125 can be prevented, it is possible to avoid that the ridge portion of the first casing member 101a on the hinge side thereof abuts against the major surface 101g of the second casing member 101b. Even when the user mistakenly operates the communication terminal, it is possible to avoid that the major surface 101g of the second casing member 101b is struck and scratched by the first casing member 101a by employing the simple structure. Moreover, when both the first rotating shaft 125 and the second rotating shaft 126 are pivotably moved, since the user can have the click feeling by way of the simple structure, the user can readily recognize the commencement and the completion of the rotating movement.

Also, when the casing 101 is under the closed condition and under the opened conditions (both first opened condition and second opened condition), the head of the fastening screw 143 is hidden, or is not exposed, while this fastening screw 143 is employed so as to fix the cover member (both front cover 141 and rear cover 142) for constituting the hinge unit 138 to the first rotating shaft 125. As a result, the outer appearance can be improved. Also, under such a condition that the first casing member 101a is pivotably moved, since the head portion of the fastening screw 143 is exposed, the cover member can be easily dismounted. Furthermore, the user who holds this communication terminal by his hand can confirm the image by viewing the inverted mirror image displayed on the second display unit 113. On the other hand, the person corresponding to the photographic object located in front of the user can confirm how the own image is photographed by viewing the mirror image displayed on the first display unit 112.

While the present invention is described in detail, or with reference to the specific embodiments, apparently, the present invention may be modified and changed without departing from the technical spirit and scope of the present invention by those skilled in the art.

The present invention is made based upon Japanese Patent Application NO. 2002-245109 filed on Aug. 26, 2002, the contents of which is incorporated herein as reference.

INDUSTRIAL APPLICABILITY

As previously described, in accordance with both the opening/closing type communication terminal and the hinge apparatus of the present invention, since the cover members are pivotably moved at the same time in connection with the rotating movement of the first rotating shaft, the cover members can be continuously made in close contact to the first rotating shaft. As a consequence, since no clearance is produced between the first rotating shaft and the cover members when the casing member is pivotably moved while the first rotating shaft is set as the axis, it is possible to avoid that rain and the like are penetrated. Also, while the first rotating shaft is set as the axis, the rotation radius can be made small. As a result, the hinge portion can be made compact.

The invention claimed is:

1. An opening/closing type communication terminal, comprising:
   a hinge portion, which couples two casing members so as to freely open and close,
   wherein the hinge portion includes:
      a first rotating member, which serves as an axis for rotating the two casing members in a predetermined direction;
      a second rotating member, which serves as an axis for rotating one casing member of the two casing members relative to the other casing member of the two casing members in a direction perpendicular to a rotating direction in which the first rotating member serves as the axis; and
      a cover member, which covers the first rotating member and the second rotating member; and
   wherein the cover member is fixed to the first rotating member;
   wherein a cable derived from the one casing member extends in the first rotating member along an axis direction of the first rotating member; and
   wherein the cable is derived from one end portion of the first rotating member to insert into the other casing member.

2. The opening/closing type communication terminal as set forth in claim 1, further comprising a rotating movement restricting member which is provided in a vicinity of a center of axis of the first rotating member, and which restricts both the rotating movement in which the first rotating member serves as the axis and the rotating movement in which the second rotating member serves as the axis in accordance with a condition of the two casing members.

3. The opening/closing type communication terminal as set forth claim 2, wherein a stable condition of the communication terminal restricted by the rotating movement restricting member corresponds to any one of:
   a condition in which the two casing members are folded so as to be opposed to each other;
   a first opened condition in which the communication terminal under the folded condition is opened by rotating the two casing members up to a first predetermined angle while the first rotating member serves as the axis; and
   a second opened condition in which the two casing members are rotated from the first opened condition up to a second predetermined angle while the second rotating shaft serves as the axis.

4. The opening/closing type communication terminal as set forth in claim 3, wherein the rotating movement restricting member restricts the rotating movement while the second rotating member serves as the axis to a predetermined direction and at the second predetermined angle under the first opened condition;
   wherein the rotating movement restricting member prohibits the rotating movement while the first rotating shaft serves as the axis under the second opened condition, and restricts the rotating movement while the second rotating member serves as the axis to a direction opposite to the second predetermined direction and at the second predetermined angle under the second opened condition; and wherein the rotating movement restricting member prohibits the rotating movement while the second rotating member serves as the axis under a condition from the folded condition up to the first opened condition.

5. The opening/closing type communication terminal as set forth in claim 3, wherein the cover member is fixed to the first rotating member by a fastening screw; and wherein the fastening screw fixes the cover member to the first rotating member at a position that the fastening screw is covered by the casing members under both the folded condition and the first opened condition, and that the fastening screw is exposed in the second opened condition.

6. The opening/closing type communication terminal as set forth in claim 3, wherein the second predetermined angle is 180 degrees at which the casing members are rotated so as to become the second opened condition from the first opened condition while the second rotating member serves as the axis;

wherein the communication terminal includes a condition detecting member which detects either the first opened condition or the second opened condition of the communication terminal;

wherein one of the two casing members includes a camera unit and a first display unit capable of displaying a picture photographed by the camera unit on one plane thereof, and includes a second display unit capable of displaying a picture formed based upon the picture photographed by the camera unit on another plane opposite to the one plane;

wherein the first display unit displays a mirror image as to the picture photographed by the camera unit under either the folded condition or the first opened condition; and wherein the first display unit displays the mirror image as to the picture photographed by the camera unit, and the second display unit displays an inverted mirror image of the mirror image under the second opened condition.

7. A hinge apparatus which is adapted to constitute the hinge portion of the opening/closing type communication terminal according to any one of claim 1 to claim 6.

* * * * *